US 10,502,132 B2

(12) United States Patent
Guijarro Valencia et al.

(10) Patent No.: US 10,502,132 B2
(45) Date of Patent: Dec. 10, 2019

(54) GAS TURBINE ENGINE WITH AN OFFTAKE

(71) Applicant: General Electric Company, Schenectady, NY (US)

(72) Inventors: Antonio Guijarro Valencia, Garching b. Munchen (DE); Vittorio Michelassi, Florence (IT)

(73) Assignee: General Electric Company, Schenectady, NY (US)

(*) Notice: Subject to any disclaimer, the term of this patent is extended or adjusted under 35 U.S.C. 154(b) by 331 days.

(21) Appl. No.: 15/440,199

(22) Filed: Feb. 23, 2017

(65) Prior Publication Data
US 2017/0321602 A1  Nov. 9, 2017

(30) Foreign Application Priority Data

Sep. 3, 2016 (IT) .................. 102016000024825

(51) Int. Cl.
F02C 7/04 (2006.01)
F02C 7/14 (2006.01)
F02C 9/18 (2006.01)
B64D 33/02 (2006.01)
F01D 9/02 (2006.01)
F02C 7/18 (2006.01)

(52) U.S. Cl.
CPC ............... *F02C 7/04* (2013.01); *B64D 33/02* (2013.01); *F01D 9/023* (2013.01); *F02C 7/14* (2013.01); *F02C 9/18* (2013.01); *B64D 2033/0286* (2013.01); *F02C 7/18* (2013.01); *F05D 2240/129* (2013.01); *F05D 2250/70* (2013.01); *Y02T 50/675* (2013.01)

(58) Field of Classification Search
CPC .... F02C 6/08; F02C 7/18; F02C 7/185; F02C 9/18; F02C 7/04; F02C 7/12; F02C 7/14; B64D 33/02; F05D 2240/129
See application file for complete search history.

(56) References Cited

U.S. PATENT DOCUMENTS

| 3,369,773 | A | 2/1968 | Erwin |
| 4,038,818 | A | 8/1977 | Snell |
| 4,064,692 | A | 12/1977 | Johnson et al. |
| 4,263,842 | A | 4/1981 | Moore |
| 7,246,484 | B2 | 7/2007 | Giffin, III et al. |

(Continued)

FOREIGN PATENT DOCUMENTS

| EP | 2 868 580 A1 | 5/2015 |
| EP | 3 054 112 A1 | 8/2016 |
| WO | 2015/080785 A2 | 6/2015 |

OTHER PUBLICATIONS

Search Report and Written Opinion issued in connection with corresponding IT Application No. 102016000024825 dated Nov. 4, 2016.

(Continued)

Primary Examiner — Craig Kim
Assistant Examiner — Katheryn A Malatek
(74) Attorney, Agent, or Firm — McGarry Bair PC

(57) ABSTRACT

An apparatus and method are disclosed for a gas turbine engine including an offtake located within the air flow of the engine. The offtake has an inlet and a louver covering the inlet. The louver has multiple airfoils arranged to direct the air flow into the inlet of the offtake.

19 Claims, 5 Drawing Sheets

(56) References Cited

U.S. PATENT DOCUMENTS

| | | | |
|---|---|---|---|
| 7,431,557 B2 | 10/2008 | Herron et al. | |
| 8,512,111 B2 | 8/2013 | Cavanaugh | |
| 8,678,760 B2* | 3/2014 | Clemen | F01D 5/141 |
| | | | 415/209.1 |
| 8,696,306 B2 | 4/2014 | Clemen | |
| 9,091,174 B2 | 7/2015 | Bagnall | |
| 2008/0080967 A1* | 4/2008 | Urbassik | F01D 11/14 |
| | | | 415/116 |
| 2013/0269366 A1* | 10/2013 | Haugen | F02C 6/08 |
| | | | 60/783 |
| 2013/0283762 A1 | 10/2013 | Simpson et al. | |
| 2015/0135661 A1 | 5/2015 | MacDonald et al. | |
| 2016/0230702 A1* | 8/2016 | Charron | F02K 1/72 |

OTHER PUBLICATIONS

Extended European Search Report and Opinion issued in connection with corresponding EP Application No. 17159440.1 dated May 2, 2017.

* cited by examiner

GAS TURBINE ENGINE WITH AN OFFTAKE

BACKGROUND

Turbine engines, and particularly gas or combustion turbine engines, are rotary engines that extract energy from a flow of combusted gases passing through the engine onto a multitude of rotating turbine blades. Typically a fan section is utilized to take in ambient air and direct it to different components of the engine for extracting energy and cooling purposes. Some of the fan air is initially directed into the compressor stages, while other portions of the fan air continue through outlet guide vanes and can later be directed into the engine components as needed.

Gas turbine engines include offtakes in areas of the engine where air is extracted from high-velocity, swirling channels to the internal air system for cooling, sealing or heat management purposes. When the angle of redirection is 90° or higher louvers or other aerodynamic shapes are required to turn the flow effectively. The louvers are typically cascades of equal length, shape and camber angle.

BRIEF DESCRIPTION

In one aspect, embodiments of relate to gas turbine engine comprising an annular fan exhaust section, an engine core at least partially located within the fan exhaust section, a cooling air offtake located in the engine core and having an inlet, a louver located at the inlet and having at least two different size airfoils in spaced axial arrangement.

In another aspect, embodiments relate to a louver assembly for an off take of a gas turbine engine comprising at least four airfoils in axial arrangement, with none of the airfoils are of the same size.

DETAILED DESCRIPTION

Figure 1:
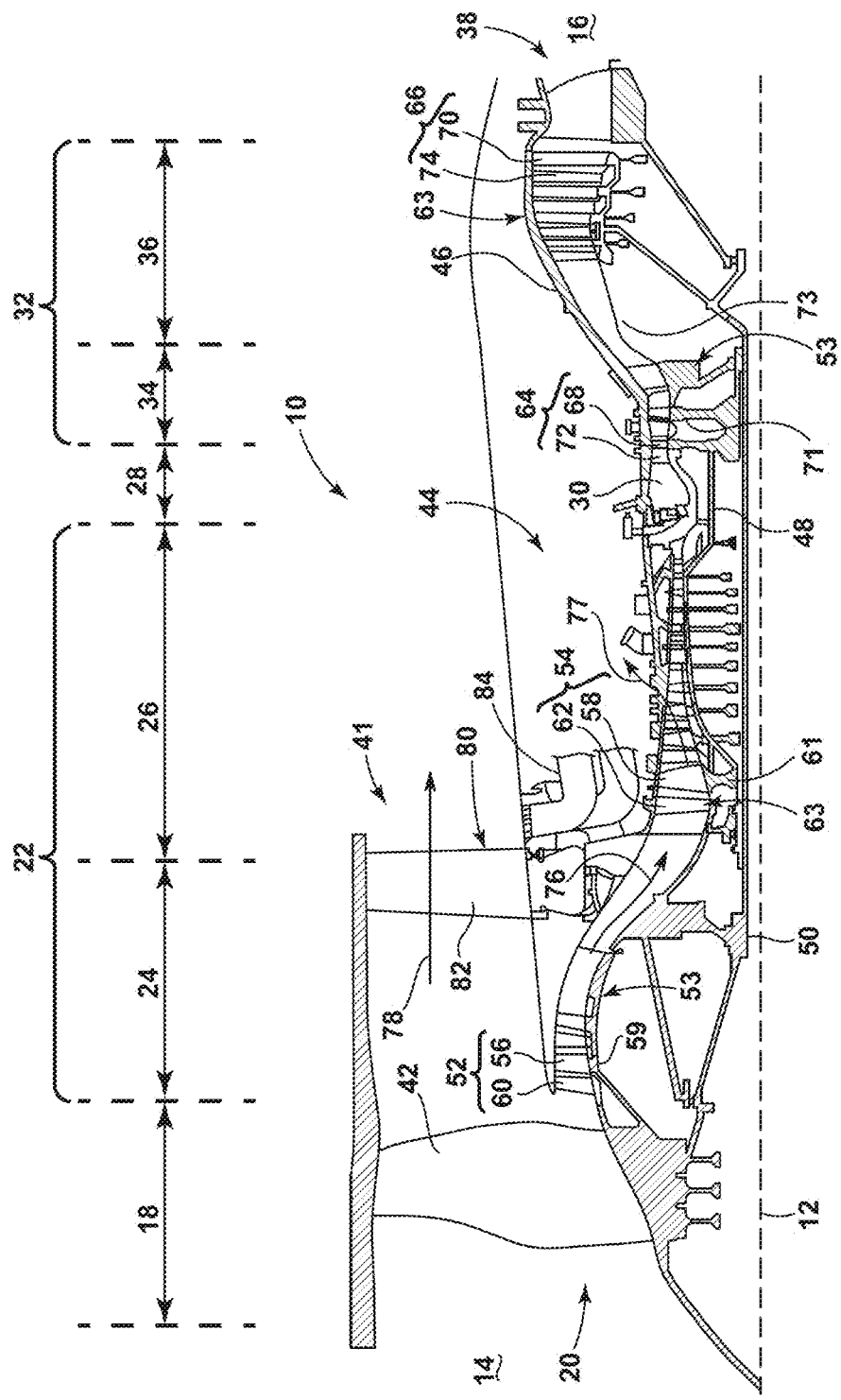
FIG. 1 is a schematic cross-sectional diagram of a gas turbine engine for an aircraft.

The described embodiments of the present invention are directed to a gas turbine engine have a louver to redirect fan air. For purposes of illustration, embodiments of the present invention will be described with respect to the turbine for an aircraft gas turbine engine. It will be understood, however, that the embodiments of the invention are not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present embodiments, and do not create limitations, particularly as to the position, orientation, or use of the embodiments. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The fan casing 40 can also surround at least a portion of the fan exhaust section 41. The HP compressor 26, the combustor 30, and the HP turbine 34 form a core 44 of the engine 10, which generates combustion gases. The core 44 is surrounded by core casing 46, which can be coupled with the fan casing 40, so that the core 44 is at least partially located within the fan exhaust section 41.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 59, which is mounted to the corresponding one of the HP and LP spools 48, 50, with each stage having its own disk 59, 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine vanes 72, 74 can be provided in a ring and can extend radially outwardly relative to the centerline 12, while the corresponding rotating blades 68, 70 are positioned downstream of and adjacent to the static turbine vanes 72, 74 and can also extend radially outwardly relative to the centerline 12, from a blade platform to a blade tip. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having its own disk 71, 73. The vanes 72, 74 for a stage of the compressor can be mounted to the core casing 46 in a circumferential arrangement.

The portions of the engine 10 mounted to and rotating with either or both of the spools 48, 50 are also referred to individually or collectively as a rotor 53. The stationary portions of the engine 10 including portions mounted to the core casing 46 are also referred to individually or collectively as a stator 63.

In operation, the airflow exiting the fan section 18 is split such that a portion of the airflow is channeled into the LP compressor 24, which then supplies pressurized ambient air 76 to the HP compressor 26, which further pressurizes the ambient air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A remaining portion of the airflow 78 bypasses the LP compressor 24 travelling through the fan exhaust section 41 and exiting the engine assembly 10 through a stationary vane row, and more particularly an outlet guide vane assembly 80, comprising a plurality of airfoil guide vanes 82. More specifically, a circumferential row of radially extending airfoil guide vanes 82 are utilized adjacent the fan section 18 to exert some directional control of the airflow 78. Upon exiting the fan exhaust section 41, the airflow 78 can be redirected using a cooling air offtake 84 for additional cooling of the engine core 44 and turbine section 32.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally the combustor 30 and components downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26. This fluid can be bleed air 77 which can include air drawn from the LP or HP compressors 24, 26 that bypasses the combustor 30 as cooling sources for the turbine section 32. This is a common engine configuration, not meant to be limiting.

Figure 2:
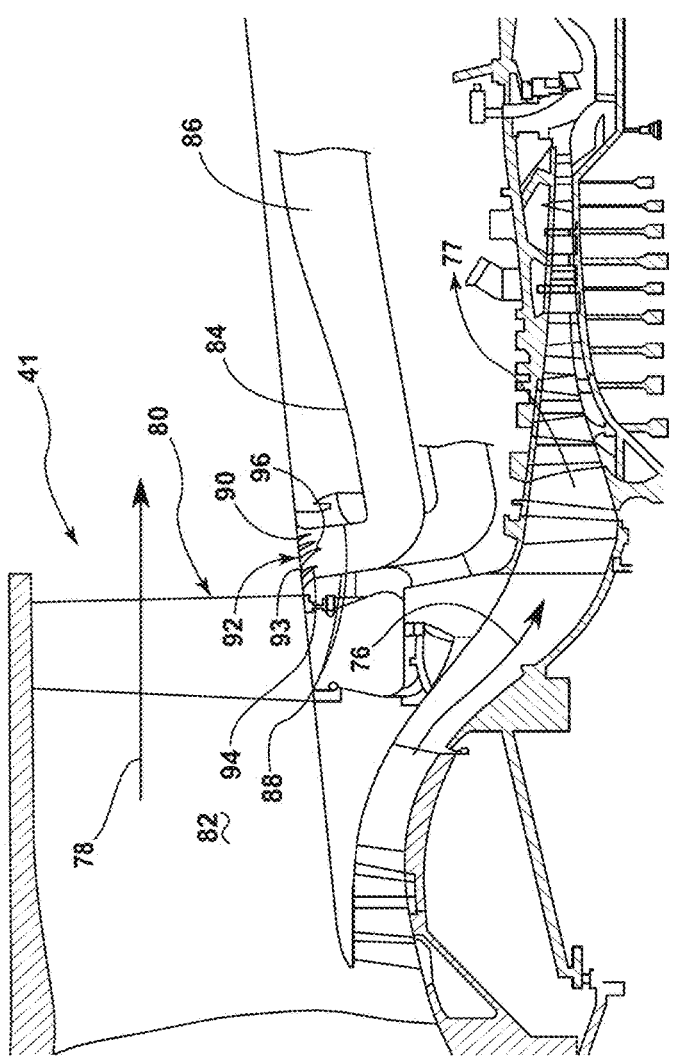
FIG. 2 is an enlarged view of a fan exhaust section of the gas turbine engine of FIG. 1.

FIG. 2 is an enlarged view of the area near the fan exhaust section 41. The cooling air offtake 84 comprises a duct 86 having walls 88 that turn through nearly 90° from a primarily radial orientation to a primarily axial orientation. The cooling air offtake 84 includes an inlet 90 located downstream of the outlet guide vane assembly 80. The inlet 90 includes a louver assembly 92 having a louver 93 comprising at least two different size airfoils 94, 96. While illustrated at a location downstream of the fan exhaust section 41, the offtake 84 can be located at any appropriate location throughout the engine.

Figure 3:
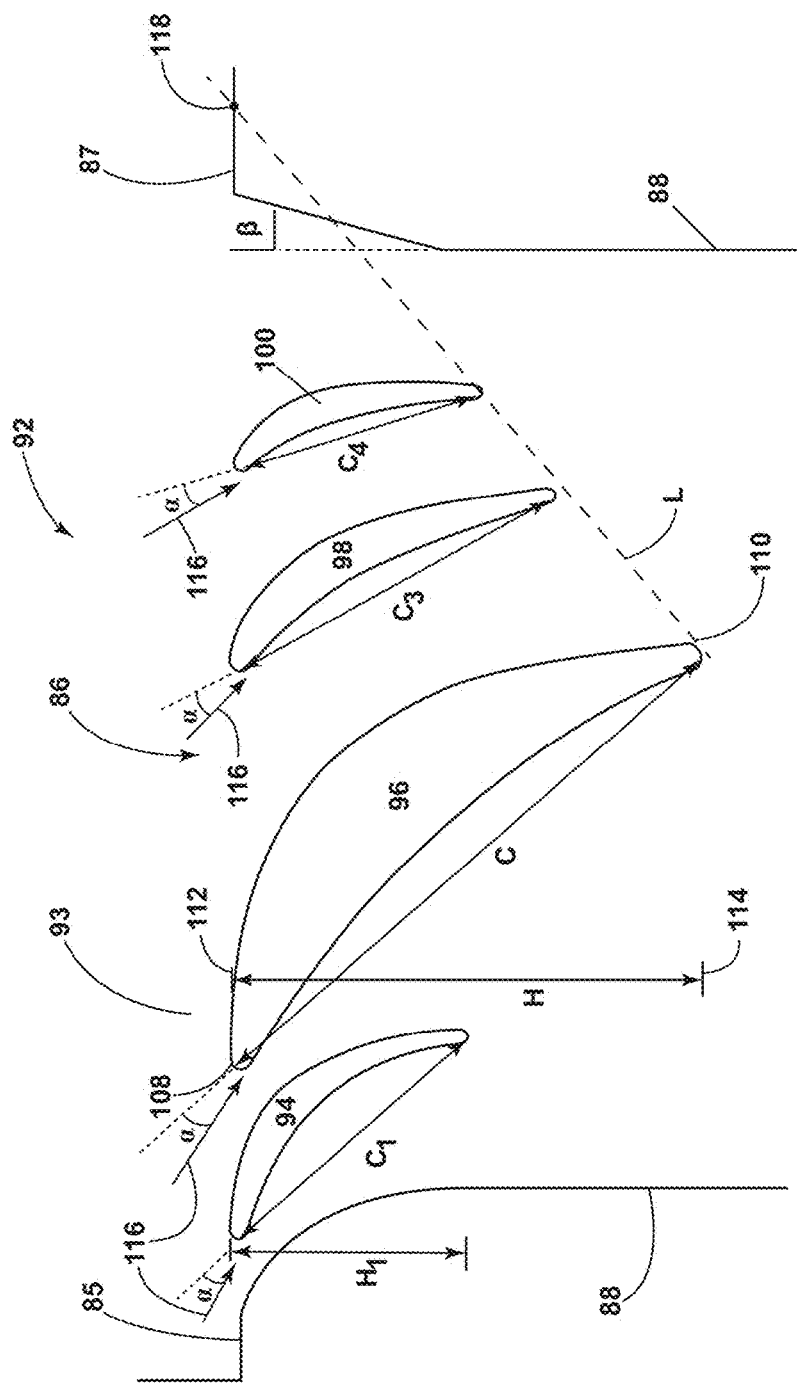
FIG. 3 is an enlarged view of an inlet with a louver having multiple airfoils for a cooling offtake duct for the gas turbine engine of FIG. 1.

In an exemplary embodiment illustrated in FIG. 3 the louver assembly 92 includes four airfoils 94, 96, 98, 100 spaced in an axial arrangement. The inlet 90 has a leading edge 85 with a rounded lip and a trailing edge 87 having a chamfer angle β of at least 20°, but not to exceed 30° measuring from the duct wall 88 towards the trailing edge 87 axially upstream. This feature will allow for higher pressure air bleed and moving the impingement point aft. An excessive angle will result in undesired pressure losses.

The geometry of airfoil 96, which will be referred to as the primary airfoil 96, is outlined in FIG. 4 described by a chord length C having a length defined as a line from a leading edge 108 to a trailing edge 110 and a height H having a length defined as a line from a radial maximum 112 to a radial minimum 114 relative to the engine centerline. Each airfoil is also described by an angle of attack α measured from a local relative wind direction 116 to a continuous line along the chord length C. For illustrative purposes the dimensions for an initial, third, and fourth airfoil 94, 98, 100 will be represented by subscripts 1, 2, and 3 respectively.

The primary airfoil 96 is geometrically larger, both with respect to the chord length C and the height H, than the other three airfoils 94, 98, 100. The maximum height H of the primary airfoil 94 is at least 2 times larger than the maximum height $H_1$ of the initial airfoil 94. The chord length C is at least 2.5 times larger than the chord length $C_1$. The axial arrangement of the airfoils comprises a geometry partially defined by a chord length relationship as follows:

$$C > C_3 > C_1 \geq C_4$$

The spaced axial arrangement includes the initial airfoil 94 nearest the leading edge 85 of the inlet 90, after which the primary airfoil 96 is located downstream of the initial airfoil 94, followed in the downstream direction by the third and fourth airfoils 98, 100. The third and fourth airfoils 98, 100 are spaced equivalently so that the distance between the duct wall 88 and the fourth airfoil 100 is nearly the same as the distance between the third and fourth airfoils 98, 100. This spacing prevents flow separation between airfoils whilst keeping a Mach number high (See FIGS. 4A and 4B)

The angle of attack a for the third and fourth airfoils 98, 100 is different than the angle of attack a for the first and second airfoil 94, 96. In an exemplary embodiment the angle of attack a for the third and fourth airfoils 98, 100 is greater than that of the first and second airfoil 94, 96.

In an exemplary embodiment, the trailing edges 110 of the third and fourth airfoils 98, 100 terminate in a line L connecting the trailing edge 110 of the primary airfoil 96 to a point 118 downstream of a trailing edge 87 of the inlet 90. This geometry causes corresponding chord lengths $C_3$, $C_4$ for the third and fourth airfoil 96, 98 become consecutively shorter. This relationship manages to turn effectively the flow whilst reducing any friction losses due to flow contact with the airfoil surface.

Figure 4A:
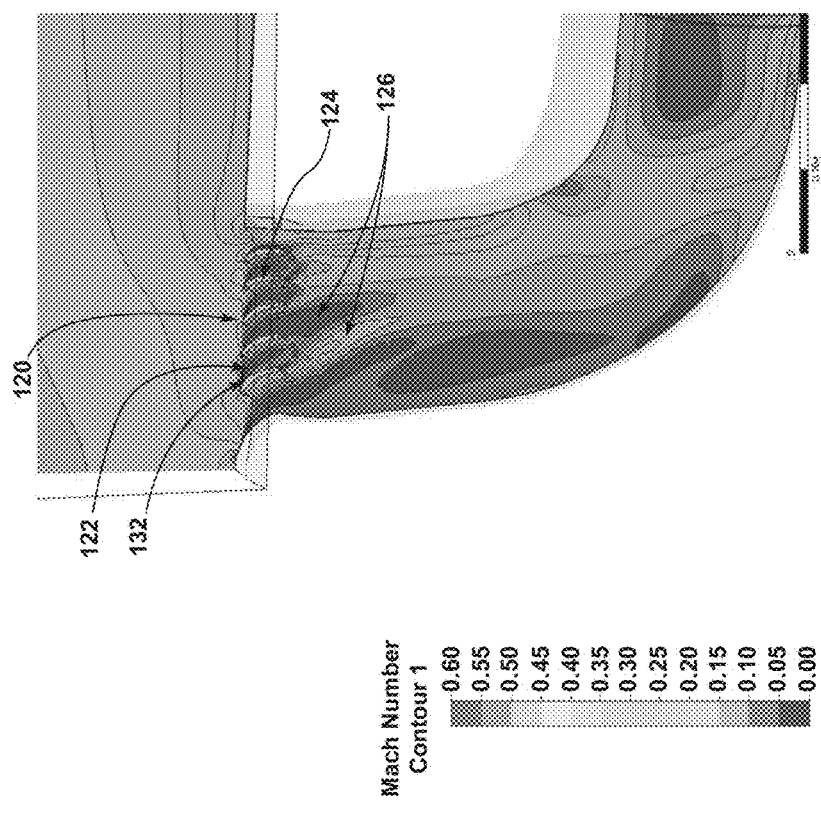
FIG. 4A is a flow diagram of a conventional louver assembly.

The overall benefit of the current embodiments is seen by the comparison of FIG. 4A, showing a contemporary louver assembly with equal sized airfoils, with substantially the same angle of attack and equal spacing, as compared to the embodiment of FIGS. 2-3. For the conventional louver assembly the flow direction is changed by guiding the airflow using a louver 122 having similar shaped airfoils 124 as depicted in FIG. 4A. This design can cause airflow separation 126 which is undesirable for effective airflow movement. Increasing the size of the primary airfoil 94 so that the louver assembly 92 comprises at least two different size airfoils 94, 96 where the second 96 is geometrically larger than the first 94. This geometry differentiation causes an acceleration 128 of the flow depicted in FIG. 4B allowing for a total engine pressure $P_t$ increase.

Figure 4B:
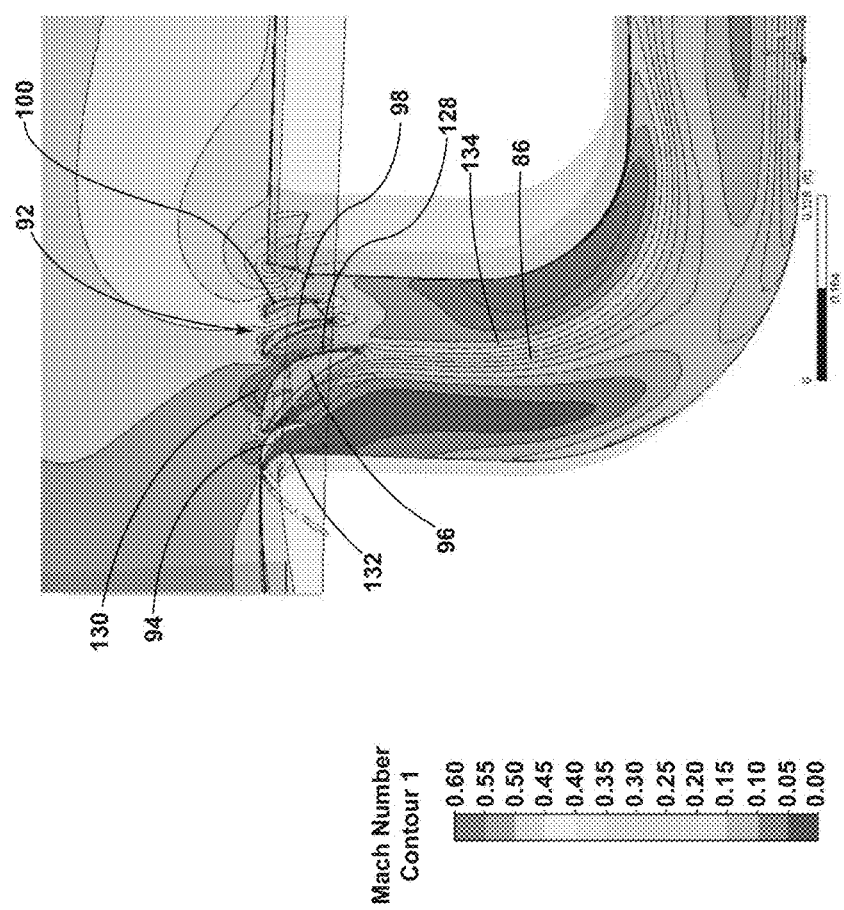
FIG. 4B is a flow diagram of an embodiment of the proposed louver assembly.

Each of the airfoils 94, 96, 98, 100 in the louver assembly 92 is designed with a purpose, ensuring the effective use of the individual aerodynamic geometry. The initial airfoil 94 is configured to stabilize a boundary layer 130 and contain recirculation 132 in the duct 86. With a conventional louver assembly 120 the boundary layer 131 is too thick and will induce separation, wherein as seen in FIG. 4B, the boundary layer 130 by both the initial airfoil 94 and primary airfoil 96 is well defined. The primary airfoil 96 is configured to accelerate 128 the flow to maximum speed 134 without flow separation. The third and fourth airfoils 98, 100 are configured to guide the flow from downstream of the primary airfoil 96 in order to prevent separation.

Thorough CFD (Computational Fluid Dynamics) analyses has been conducted and supports the benefit of the louver assembly 92 as compared to conventional louver assemblies 120. 2D optimization backed up with a 3D analysis has been carried out with tabulated results following. The pressure recovery is maximized whether considering an area from the fan exhaust section 41 to the HP turbine 34 or from the fan exhaust section 41 to the LP turbine 36 both of which enable a reduction in bled flow. The following table compares a first engine recovery ratio to a second engine recovery ratio where the second engine recovery ration includes the louver assembly 92 in place and the pressure recovery is at least 0.30. The goal is to maintain the highest total pressure ($P_t$) as possible so as to best move air through the duct to the turbine sections.

| Recovery = $(Pt - P_{s13})/$ $(P_{t13} - P_{s13})$ | Recovery | Total Pressure (Stage 13) $P_{t13}$ | Static Pressure (Stage 13) $P_{s13}$ | Total Pressure $P_t$ |
|---|---|---|---|---|
| One Engine with conventional louver design | 0.131 | 8.07 | 6.82 | 6.99 |
| Second Engine with proposed louver assembly through the HP turbine | 0.362 | 8.369 | 7.097 | 7.557 |
| Second Engine with proposed louver assembly through the LP turbine | 0.349 | 8.369 | 7.097 | 7.541 |

Benefits to increasing the pressure recovery and reducing the mass flow include allowing for the duct flow to be reduced while maintain power. As the room for designing pipes is typically constrained, the introduction of this approach enables that duct pipes to be designed with more flexibility.

It should be appreciated that application of the disclosed design is not limited to turbine engines with fan and booster sections, but is applicable to turbojets and turbo engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine engine comprising: an annular fan exhaust section;
an engine core at least partially located within the fan exhaust section;
a cooling air offtake which bleeds bypass air from a bypass duct, wherein the cooling air offtake is located in the engine core and having an inlet extending between a leading edge and a trailing edge; and
a louver located at the inlet and having at least two different size airfoils including an initial airfoil. and a primary airfoil in spaced axial arrangement with the initial airfoil located nearer to the leading edge of the inlet than the primary airfoil and the initial airfoil is axially spaced from the leading edge of the inlet;
wherein the primary airfoil has a primary chord length greater than an initial chord length of the initial airfoil.

2. The gas turbine engine of claim 1, wherein the primary airfoil has a primary maximum height greater than an initial maximum height of the initial airfoil.

3. The gas turbine engine of claim 2, wherein the primary chord length of the primary airfoil is at least 2.5 times greater than the initial chord length of the initial airfoil.

4. The gas turbine engine of claim 3, wherein the primary maximum height of the primary airfoil is at least 2 times greater than the initial maximum height of the initial airfoil.

5. The gas turbine engine of claim 2, further comprising third and fourth airfoils downstream of the primary airfoil.

6. The gas turbine engine of claim 5, wherein the third and the fourth airfoils have chords that are smaller than the chord of the primary airfoil.

7. The gas turbine engine of claim 6, wherein the third airfoil has a third chord length that is greater than a fourth chord length of the fourth airfoil and the initial chord length of the initial airfoil.

8. The gas turbine engine of claim 7, wherein an angle of attack of the third and fourth airfoils is greater than an angle of attack of the initial and primary airfoils.

9. The gas turbine engine of claim 7, wherein the leading edge of the inlet has a rounded lip.

10. The gas turbine engine of claim 9, wherein the trailing edge of the inlet has a chamfer.

11. The gas turbine engine of claim 1, wherein the at least two different size airfoils are shaped to provide a pressure recovery of at least 0.3.

12. The gas turbine engine of claim 11, wherein the pressure recovery is at least 0.34.

13. A louver assembly in a gas turbine engine located in an offtake which bleeds bypass air from a bypass duct, wherein the louver assembly has an inlet extending between a leading edge and a trailing edge, comprising at least four airfoils in axial arrangement, a first airfoil axially spaced from the leading edge of the inlet, and a primary airfoil axially spaced from the first airfoil, wherein the first airfoil is located nearer to the leading edge of the inlet than the primary airfoil, and the primary airfoil having a. primary chord length greater than a chord length of any of the other airfoils of the at least four airfoils, wherein none of the at least four airfoils are of the same size.

14. The louver assembly of claim 13, wherein the primary airfoil chord length is at least 2.5 times greater than a first chord length of the first airfoil.

15. The louver assembly of claim 13, wherein a third airfoil of the at least four airfoils and a fourth airfoil of the at least four air foils both have a different angle of attack than an angle of attack of both the first and primary airfoils.

16. The louver assembly of claim 15, wherein the fourth airfoil has a fourth chord length that is less than a third chord length of the third airfoil.

17. The louver assembly of claim 16, wherein the leading edge has a rounded lip and the trailing edge has a chamfer.

18. The louver assembly of claim 17, wherein the at least four different size airfoils are shaped to provide a pressure recovery of at least 0.3.

19. The louver assembly of claim 15, wherein the different angle of attack of both the third and fourth airfoils is greater than the angle of attack for both the first and primary airfoils.

* * * * *